(12) United States Patent
Yokogi (10) Patent No.: US 6,498,591 B2
(45) Date of Patent: Dec. 24, 2002

(54) DIVERSITY ANTENNA APPARATUS AND METHOD

(75) Inventor: Kiyotada Yokogi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/907,124

(22) Filed: Jul. 17, 2001

(65) Prior Publication Data

US 2002/0044089 A1 Apr. 18, 2002

(30) Foreign Application Priority Data

Jul. 19, 2000 (JP) .......................................... 2000-219506

(51) Int. Cl.[7] .............................................. H01Q 21/00
(52) U.S. Cl. ............................... 343/893; 343/700 MS; 343/844; 455/277.1
(58) Field of Search ..................... 343/700 MS, 702, 343/844, 853, 893; 455/89, 90, 277.1

(56) References Cited

U.S. PATENT DOCUMENTS

| | | | | |
|---|---|---|---|---|
| 5,787,174 A | * | 7/1998 | Tuttle .......................... | 324/764 |
| 5,914,691 A | * | 6/1999 | Mandai et al. ............... | 343/702 |
| 6,163,299 A | * | 12/2000 | Park ..................... | 343/700 MS |
| 6,297,780 B1 | * | 10/2001 | Kirisawa ..................... | 343/702 |
| 6,417,806 B1 | * | 7/2002 | Gothard et al. ...... | 343/700 MS |

* cited by examiner

*Primary Examiner*—Tan Ho
(74) *Attorney, Agent, or Firm*—Fommer Lawrence & Haug LLP; William S. Frommer; Dennis M. Smid (57) ABSTRACT

A diversity antenna apparatus and method adaptable for use with communication equipment is provided which can assure an acceptable transmission and/or reception condition in three principal dimensional (X,Y,Z) directions. The diversity antenna apparatus may comprise a plurality of antennae for transmitting and/or receiving a circularly polarized wave and an antenna selection circuit which selects one of the antennae for transmission and/or reception based on information representative of reception levels of the antennae. A first group of the antennae may provide a first substantially semispherical radiation pattern and a second group of the antennae may provide a second substantially semispherical radiation pattern such that the first and second groups of antennae as a whole provide a substantially spherical radiation pattern.

22 Claims, 7 Drawing Sheets

DIVERSITY ANTENNA APPARATUS AND METHOD

BACKGROUND OF THE INVENTION

The present invention relates to a diversity antenna apparatus usable with various communication devices to enable transmission and/or reception of a signal having a polarized waveform.

SUMMARY OF THE INVENTION

Figure 1:
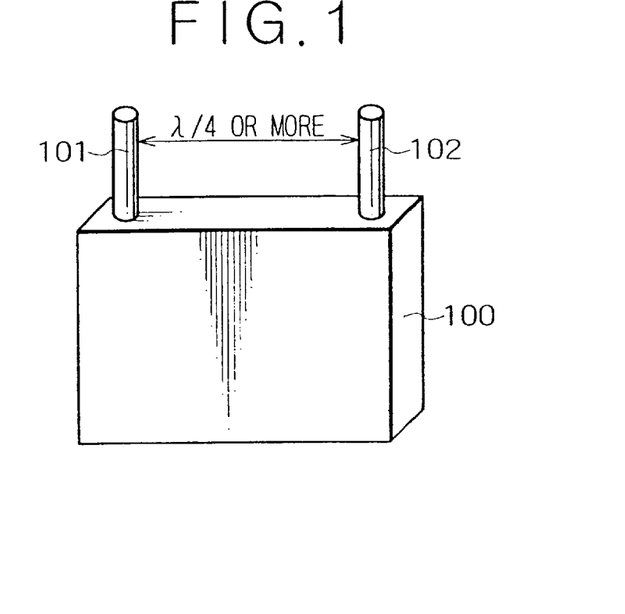
FIG. 1 is a perspective view of a portable communication apparatus.

Communication devices, such as a portable telephone set and other portable-type devices, may utilize a diversity antenna apparatus having a plurality of antennae which are selectively used to assure a high anti-multi-path characteristic or multi-path resisting property. An example of such portable communication device is illustrated in FIG. 1. As shown therein, portable communication apparatus 100 includes two antennae 101 and 102 which are spaced apart from each other by a distance equal to or greater than $\lambda/4$ where $\lambda$ is the wavelength of an electromagnetic wave which may be transmitted and/or received by the antennae 101 and 102. The portable communication apparatus 100 transmits and/or receives a signal using the one of antennae 101 and 102 which provides a more favorable condition.

Figure 2:
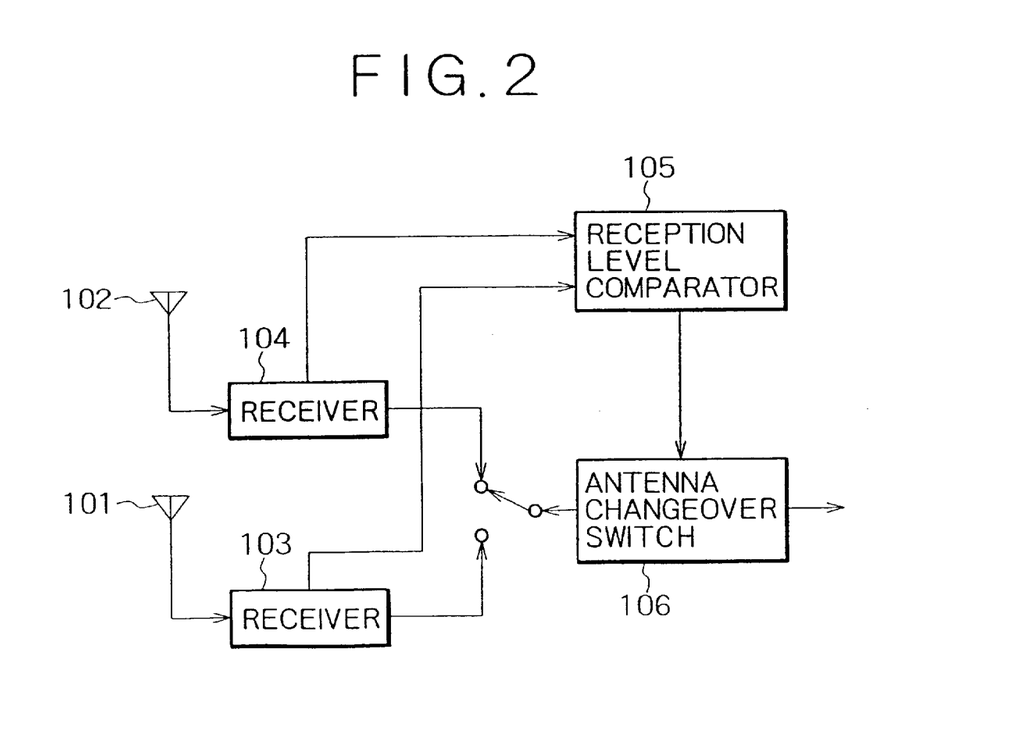
FIG. 2 is a diagram of a reception circuit provided in the portable communication apparatus of FIG. 1.

The portable communication apparatus 100 may use a circuit such as that illustrate in FIG. 2 to select one of the two antennae. As shown in FIG. 2, the antennae 101 and 102 are respectively connected to receivers 103 and 104. Outputs of the receivers 103 and 104 are supplied to a reception level comparator 105 and compared thereat to each other so as to determine the one of the antennae 101 and 102 which exhibits a more favorable output characteristic and form a comparison signal therefrom. Such comparison signal is supplied from the reception level comparator 105 to an antenna changeover switch 106 which, in response thereto, switchably selects the appropriate output signal from the receiver 103 or 104 which corresponds to the antennae 101 or 102 which exhibits a more favorable output characteristic.

In the portable communication apparatus 100, to assure an acceptable transmission and/or reception state the two antennae 101 and 102 are disposed from each other by a predetermined distance (such as a distance equal to or greater than $\lambda/4$) so as to make use of a so-called space divesity effect. In other words, the antennae are spaced sufficiently apart from each other such that the manner in which each antenna undergoes fading varies independently of each other. An acceptable transmission and/or reception state may be provided unless the fading associated with both of the two antennae 101 and 102 fall is significant.

Figure 3:
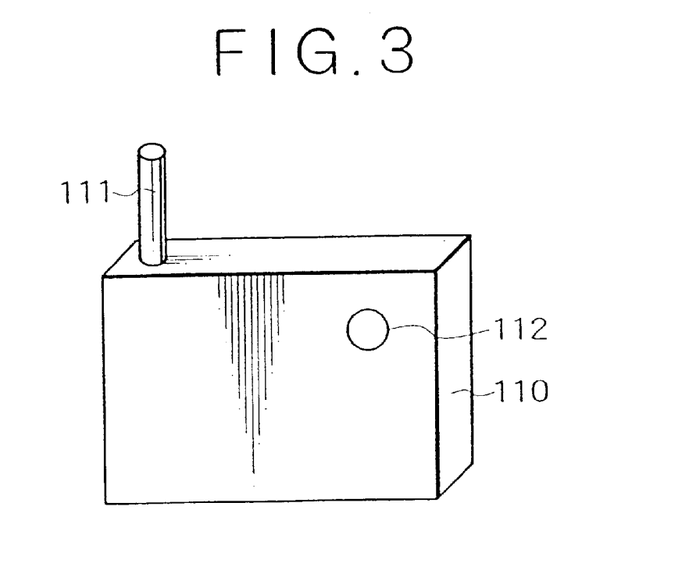
FIG. 3 is a perspective view of another portable communication apparatus.

FIG. 3 illustrates a portable communication apparatus 110 which utilizes a diversity antenna apparatus. As shown therein, the portable communication apparatus 110 includes two antennae 111 and 112 disposed on different faces thereof. The portable communication apparatus 110 transmits and/or receives a signal using the one of antennae 111 and 112 which exhibits a more favorable state. Such antenna may be selected in a manner similar to that of portable communication apparatus 100.

In the portable communication apparatus 110, the antenna 112 is set to have a sharp directivity so as to assure a high gain thereby allowing an electromagnetic wave used for transmission and/or reception to reach over a relatively large distance and assure a good anti-multi-path characteristic. Since the portable communication apparatus 110 transmits and/or receives a signal using the one of the antennae 111 and 112 which exhibits a more favorable state, a good transmission and/or reception state can be assured using a radiation pattern diversity effect.

Radio communication between various apparatus in a home, office or the like may occur. In such radio communication, it may be necessary to transmit and receive a signal between floors in a building. Further, a communication apparatus (such as a portable-type communication apparatus) may be inclined at any angle with respect to the ground while being used. In this situation, if an antenna is fixed to the body of the portable communication apparatus, then the orientation of the antenna may vary in response to the inclination of the apparatus body.

Figure 4A:
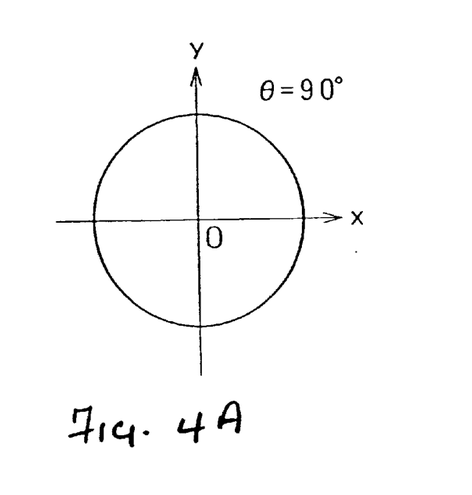
FIGS. 4A and 4B are diagrams of a radiation pattern of an antenna for use with a portable communication apparatus.
Figure 4B:
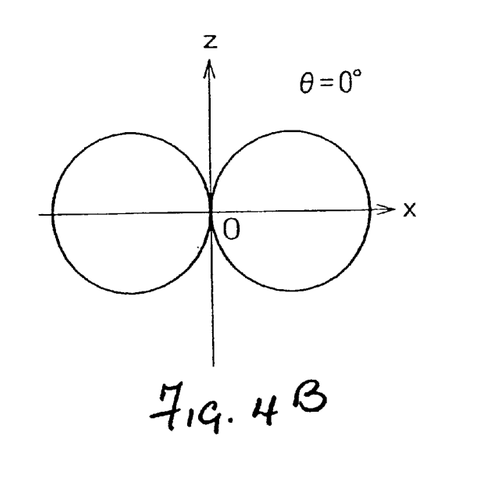
Figure 5A:
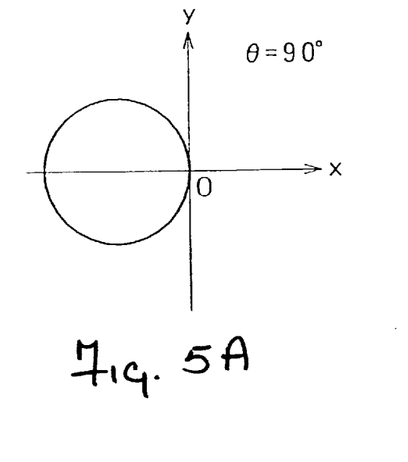
FIGS. 5A and 5B are diagrams of another radiation pattern of another antenna for use with a portable communication apparatus.
Figure 5B:
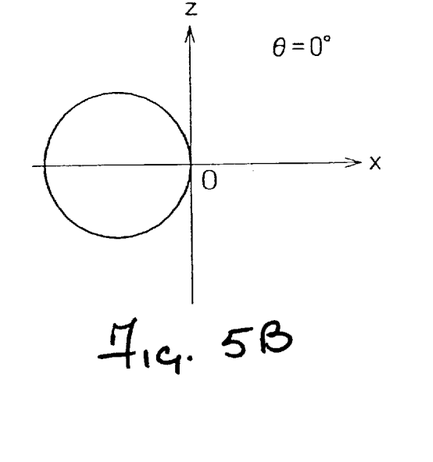

The diversity antenna apparatus described above are for outdoor use or for use on the same floor in a building. These apparatus may have a radiation pattern associated therewith which provides a favorable gain in a direction parallel to the ground. As an example, each antenna of the portable communication apparatus 100 and 110 may have a radiation pattern as shown in FIG. 4 or 5. That is, antennae 101, 102 and 111 may have a radiation pattern such as shown in FIGS. 4A and 4B, and antenna 112 may have a radiation pattern such as shown in FIGS. 5A and 5B.

As may be apparent from FIGS. 4 and 5, it may be difficult for the above-described diversity antenna apparatus to transmit and/or receive an electromagnetic wave along a z-axis direction, that is, in an upward or downward direction. Therefore, although such diversity antenna apparatus may favorably resist against multi-path interference in the same plane, such apparatus may not be suitable for transmission and/or reception in all three principal dimensional directions. In addition, since such diversity antenna apparatus may be used with a linearly polarized wave (such as a horizontally polarized wave or a vertically polarized wave), the transmission and/or reception condition may vary greatly due to the angle of the antenna with respect to the ground.

Accordingly, the above-described diversity antenna apparatus may not be able to ensure acceptable or stable transmission and/or reception conditions when used for radio communication in a home, office or the like or applied to various portable communication apparatus because the polarization plane of the signal varies depending upon the location and/or orientation of the communication apparatus.

According to the present invention, a diversity antenna apparatus is provided which comprises (a) a plurality of antennae for transmitting and/or receiving a circularly polarized wave, and b) an antenna selection circuit which selects one of the antennae for transmission and/or reception based on information representative of reception levels of the antennae, in which a first group of the antennae provides a first substantially semispherical radiation pattern and a second group of the antennae provides a second substantially semispherical radiation pattern such that the first and second groups of antennae as a whole provide a substantially spherical radiation pattern.

By utilizing a diversity antenna apparatus having a plurality of antennae with a substantially spherical radiation pattern associated therewith, an acceptable transmission and/or reception state may be provided in all directions. As such, the transmission and/or reception state may not be significantly varied due to an angular change of the antennae with respect to the ground. Further, a circularly polarized wave may be used for transmission and/or reception. As a result, an augmented antimulti-path characteristic can be achieved. Therefore, such diversity antenna apparatus may be suitably adapted for use in a home, office or the like or for use with various portable communication apparatus.

The above and other objects, features and advantages according to the present invention will be apparent from the following detailed description of the illustrated embodiments when read in conjunction with the accompanying drawings in which corresponding components are identified by the same reference numerals.

DETAILED DESCRIPTION OF PREFERRED EMBODIMENTS

Figure 6:
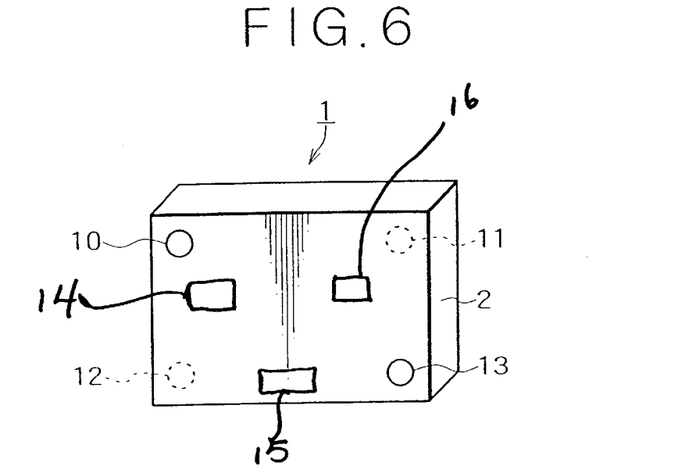
FIG. 6 is a perspective view of another portable communication apparatus.
Figure 7:
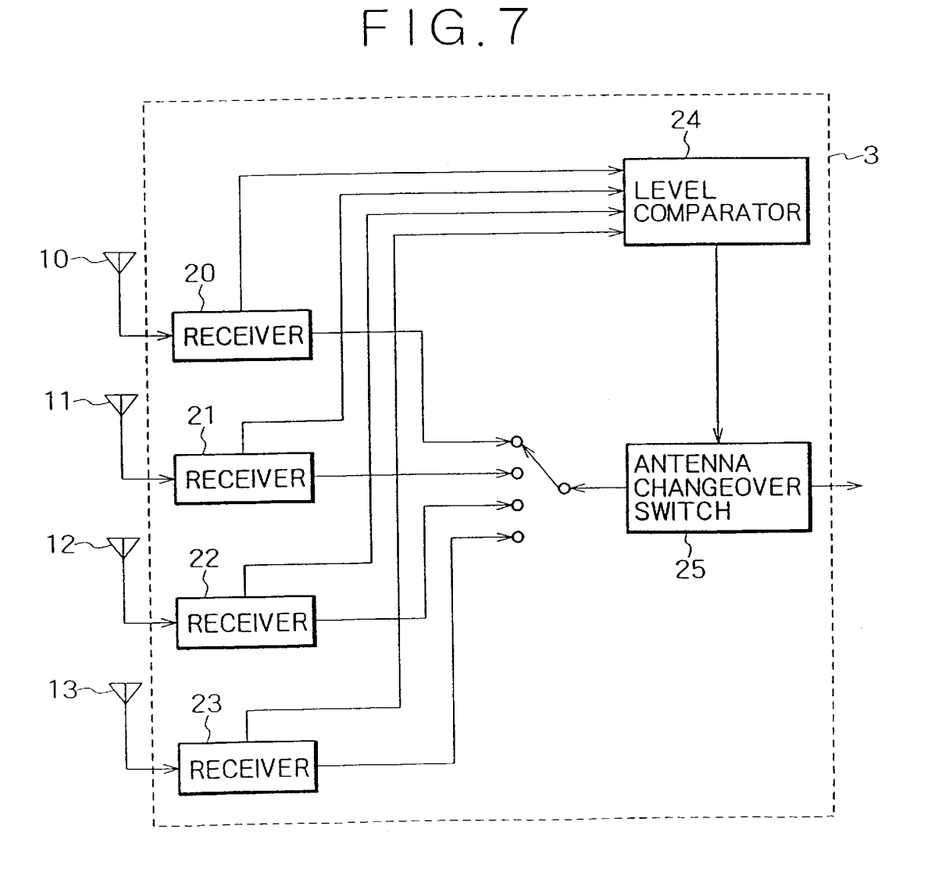
FIG. 7 is a diagram of a reception circuit of the portable communication apparatus of FIG. 6.

A portable communication apparatus 1 having a diversity antenna apparatus is illustrated in FIGS. 6 and 7. The portable communication apparatus 1 is adapted to transmit and/or receive various information signals by radio communication. Further, such communication apparatus may have a relatively small size and a relatively small weight. It is to be noted that the present invention is not limited to use with such a portable communication apparatus, but may be applied to other apparatus which transmit and/or receive various kinds of information by radio communication.

The portable communication apparatus 1 may include first to fourth antennae 10, 11, 12 and 13 which may be provided on one or more faces of apparatus body 2 of the portable communication apparatus. As an example, antennae 10 and 13 may be provided on one face of the body 2 and antennae 11 and 12 may be provided on another face such as an opposite face thereof. The portable communication apparatus 1 may include a reception circuit 3 (FIG. 7) which may be arranged inside the apparatus body 2. The first to fourth antennae 10, 11, 12 and 13 and the reception circuit 3 may function as a diversity antenna apparatus which may be utilized to effect radio communication by the portable communication apparatus 1. The portable communication apparatus 1 may further include a display device 14 (such as a liquid crystal display apparatus), an input device 15 (which may include a number of input buttons and/or a keyboard or the like), and an informational and other types of devices 16.

The first to fourth antennae 10, 11, 12 and 13 may each be a patch antenna and may be used to transmit and/or receive a circularly polarized wave. A patch antenna may include an element having a predetermined shape and fabricated from a predetermined material (such as a square metal element) arranged a predetermined distance from and in parallel to a base plate fabricated from a predetermined material (such as a metal base plate) and have feeding points on two adjacent sides of the square metal element. Although the antennae 10–13 have been described as being patch antennae, the present invention is not so limited. Alternatively, other types of antennae which transmit and/or receive a circularly polarized wave may be utilized.

As shown in FIG. 7, the reception circuit 3 may include first to fourth receivers 20, 21, 22 and 23 respectively connected to the first to fourth antennae 10–13, a level comparator 24, and an antenna changeover switch 25.

The first to fourth receivers 20–23 may respectively receive electromagnetic waves from the first to fourth antennae 10–13, extract signal components therefrom and output the extracted signal components as reception signals. Further, the first to fourth receivers 20–23 may output signals representative of the levels of the reception signals to the level comparator 24.

The level comparator 24 may receive the reception level signals from the first to fourth receivers 20–23 and compare the magnitude of the reception levels with each other to determine which of the first to fourth antennae 10, 11, 12 and 13 provides the best reception state. Thereafter, the level comparator 24 may output a comparison signal indicative of the result of such determination to the antenna changeover switch 25.

The antenna changeover switch 25 may select the reception signal from the one of the first to fourth antennae 10–13 which exhibits the best reception condition in response to the comparison signal from the level comparator 24. The antenna changeover switch 25 may output the selected reception signal to other electronic circuits and/or information processing apparatus included in the portable communication apparatus 1 such as informational device 16.

Therefore, in the present embodiment, the reception level signals outputted from the first to fourth receivers 20–23 indicate the reception levels of the respective antennae and thus provide reception level information. The reception circuit 3 may select a reception signal outputted from the antenna which exhibits the highest reception level, that is, the antenna which provide the best reception condition.

Additionally, the level comparator 24 and the antenna changeover switch 25 may operate to select an antenna based on the reception level information.

Although the reception circuit 3 has described herein so as to include a plurality of receivers 20–23, level comparator 24, and antenna changeover switch 25 and operate with a plurality of antennae 10–13 to receive a signal, the present invention is not limited. Instead, other configurations may also be utilized. As an example, the portable communication apparatus 1 having a diversity antenna apparatus may be configured such that, in addition to the receivers 20–23, transmitters are coupled to the antennae 10–13 such that both transmission and reception may be performed by the antennae 10–13. In such situation, it may be preferable during transmission to use the antenna selected for reception.

In the portable communication apparatus 1, the first antenna 10 and the fourth antenna 13 may be paired with each other and the second antenna 11 and the third antenna 12 may be paired with each other, and the antennae in each pair may be spaced apart by a distance equal to or greater than λ/4 where λ is the wavelength of the electromagnetic wave. As a result, both antennae in each pair may be prevented from fading significantly.

In the portable communication apparatus 1, since the first to fourth antennae 10–13 may be disposed in paired relationships in which the antennae are spaced sufficiently from each other such that fading of the individual antennae may vary independently of each other (so as to employ a space diversity effect) as described above and may be selectively used for transmission and/or reception, acceptable transmission and/or reception conditions may be provided.

Figure 8A:
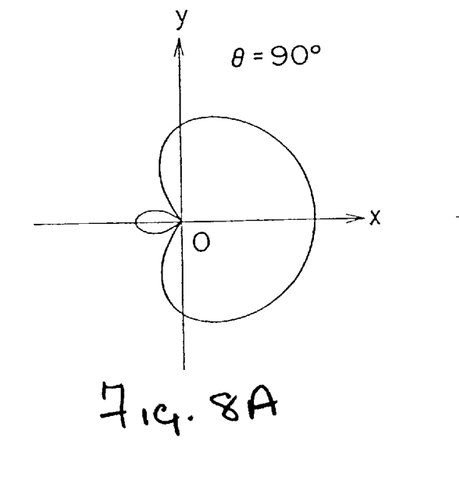
FIGS. 8A and 8B are diagrams of a radiation pattern of the first and fourth antennae of the portable communication apparatus of FIG. 6.

In the portable communication apparatus 1, the first antenna 10 and the fourth antenna 13, and the second antenna 11 and the third antenna 12 may have radiation patterns such as shown in FIGS. 8A/8B and 9A/9B, respectively. Such radiation patterns are obtained by having the portable communication apparatus 1 arranged in a predetermined orientation of a rectangular coordinate system as shown in FIG. 10 (that is, in an orientation such that the face of the portable communication apparatus 1 on which the first to fourth antennae 10–13 are shown is directed in a direction substantially parallel to the positive direction of the x-axis). Further, in developing the radiation patterns shown in FIGS. 8 and 9, each antenna has been positioned at the origin of the coordinate system.

Figure 8B:
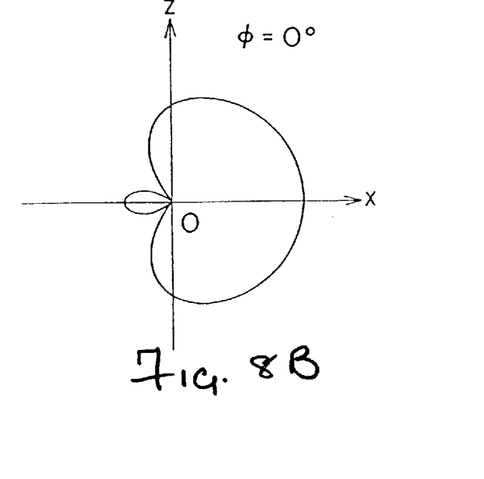
Figure 9A:
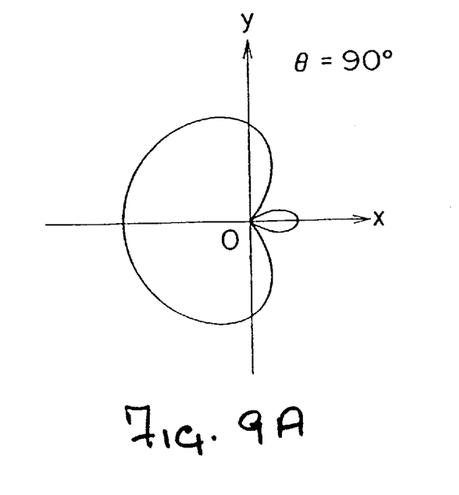
FIGS. 9A and 9B are diagrams of a radiation pattern of the second and third antennae of the portable communication apparatus of FIG. 6.
Figure 9B:
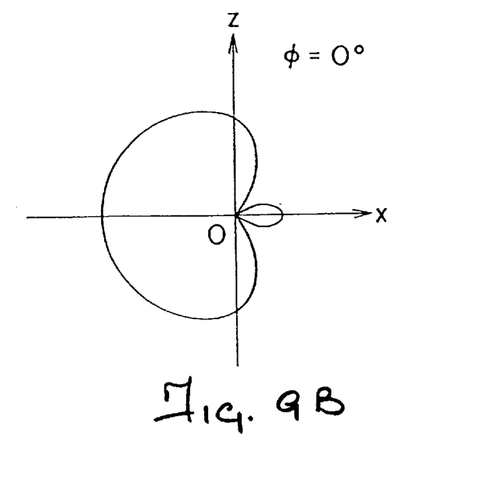
Figure 10:
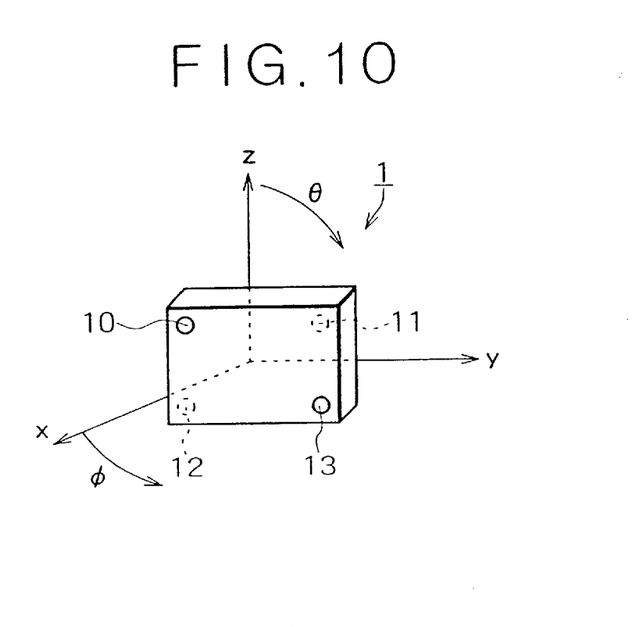
FIG. 10 is a view of the portable communication apparatus of FIG. 6 and a coordinate system for the radiation patterns of FIGS. 8 and 9.

As seen from FIGS. 8 and 9, the first and fourth antennae 10 and 13 and the second and third antennae 11 and 12 have radiation patterns whose directivity is respectively directed along the positive direction and the negative direction of the x-axis. As a result, in the portable communication apparatus 1, the one of the first and fourth antennae 10 and 13 (having directivity directed along the positive direction of the x-axis) and the second and third antennae 11 and 12 (having directivity directed along the negative direction of the x-axis) which exhibits a better reception state may be select for used during transmission and/or reception operations. Thus, by utilizing a so-called directive diversity effect as described, the portable communication apparatus 1 may provide an acceptable transmission and/or reception state.

Furthermore, in the portable communication apparatus 1, the first and fourth antennae 10 and 13 and the second and third antennae 11 and 12 may have semispherical radiation patterns and opposite directivities to each other as seen in FIGS. 8 and 9. As such, the first to fourth antennae 10–13 as a whole may have a substantially spherical radiation pattern. By employing an antenna apparatus which provides such spherical radiation pattern, the portable communication apparatus 1 may provide an acceptable transmission and/or reception condition along all three principal dimension (X,Y,Z) directions.

Figure 12A:
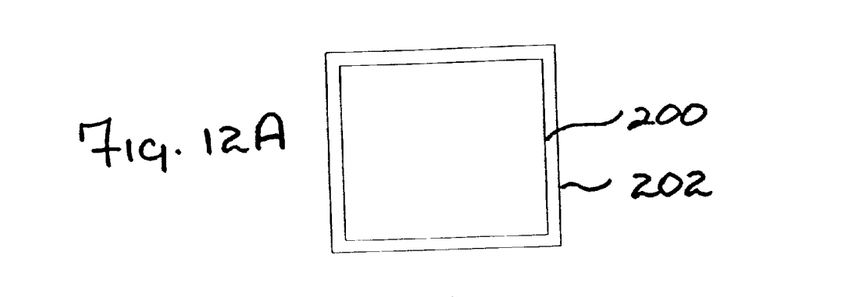
FIGS. 12A and 12B are diagrams of an antenna.
Figure 12B:
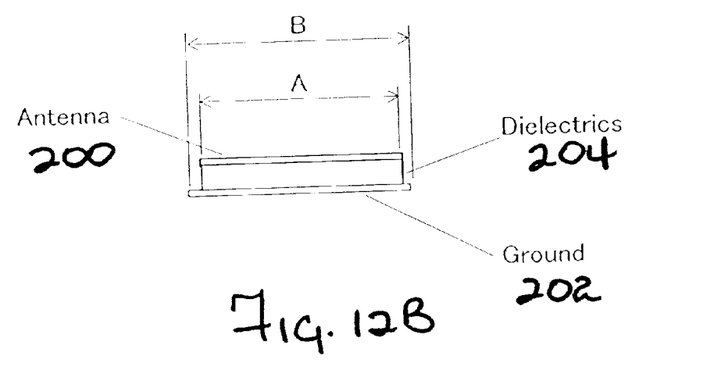

Each of the antennae 10–13 may include a square-shaped metal element or patch antenna 200 and a metal base plate or ground 202 separated by a dielectric 204 as illustrated in FIGS. 12A and 12B. The patch antenna 200 may have a length dimension A where $A \approx 0.49 \times \lambda_0 / \sqrt{\epsilon_{65}}$ in which $\lambda_0$ represents a wave length in free space and $\epsilon_{65}$ represents a relative dielectric constant (e.g., 5.0 for ceramic), and the base plate 202 may have a length dimension B. To provide semispherical radiation patterns for the first to fourth antennae 10–13 as, for example, shown in FIGS. 8 and 9, the magnitude ratio between A and B of each antenna may be adjusted to a predetermined value. Preferably, the ratio A/B may have a value within the range of 1/(1.5) to 1/(1.2) wherein 1.2 is associated with a circularly polarized wave preferred limit and 1.5 is associated with a semispherical radiation pattern preferred limit.

In the portable communication apparatus 1, a diversity antenna apparatus may be incorporated therein such that the first to fourth antennae 10–13 as a whole provide a substantially spherical radiation pattern and each utilizes a circularly polarized wave for transmission and/or reception. Generally, a higher anti-multi-path characteristic may be achieved when a circularly polarized wave is used for transmission and/or reception as compared to a situation wherein a linearly polarized wave is used for transmission and/or reception. This is due to the fact that since the rotational direction of a circularly polarized wave is changed to the opposite direction when the circularly polarized wave hits and is reflected by an object, the circularly polarized wave received after an odd number of times of reflection after being transmitted has the opposite rotational direction. Additionally, an ideal right circular polarization antenna does not receive a left circularly polarized wave. In other words, in this situation, the ideal right circular polarization antenna may receive a circularly polarized wave which has not been reflected after being transmitted or which has been reflected an even number of times after being transmitted. Therefore, theoretically the influence of multi-path interference can be reduced to one half.

Further, a portable communication apparatus utilizing linearly polarized waves may not provide acceptable transmission and/or reception conditions. That is, such portable communication apparatus may use a linearly polarized wave for transmission and/or reception such that the polarization direction of the linearly polarized wave coincides with a direction perpendicular to the surface of the ground. As a result, if the angle of an antenna changes with respect to the surface of the ground, then the transmission and/or reception condition may vary greatly, and this may make it difficult for the portable communication apparatus to provide an acceptable transmission and/or reception state.

On the other hand, since the portable communication apparatus 1 having a diversity antenna apparatus may use a circularly polarized wave whose polarization direction is constantly rotating for transmission and/or reception, the transmission and/or reception state may not vary significantly due to an angular change of the antenna with respect to the ground. Accordingly, the portable communication apparatus 1 may provide an acceptable transmission and/or reception state irrespective of the angle or direction of the antenna with respect to the ground.

Therefore, since each antenna of the portable communication apparatus 1 may be configured so as to use a circularly polarized wave for transmission and/or reception, the influence of multi-path interference can be reduced, and since the transmission and/or reception state may not be significantly varied by an angular change of the antenna with respect to the ground, an acceptable transmission and/or reception condition may be provided.

Thus, since the portable communication apparatus 1 includes the diversity antenna apparatus which as a whole provides a substantially spherical radiation pattern, an acceptable transmission and/or reception state in all three-principal dimensional directions may be provided. Further, since each antenna of the portable communication apparatus 1 may be configured so as to use a circularly polarized wave for transmission and/or reception, the influence of multi-path interference can be reduced to ensure an acceptable transmission and/or reception state regardless of the angle or direction of the antenna. Therefore, due to a synergetic effect of these two features, the portable communication apparatus 1 can exhibit superior transmission and/or reception characteristics.

Figure 11A:
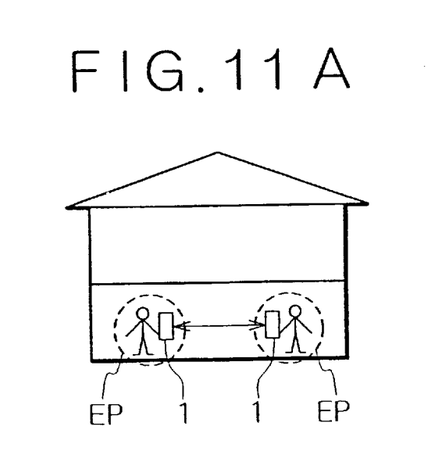
FIGS. 11A and 11B are views respectively illustrating two portable communication apparatus used for transmission and/or reception on the same floor of a building and for transmission and/or reception on different floors of a building.
Figure 11B:
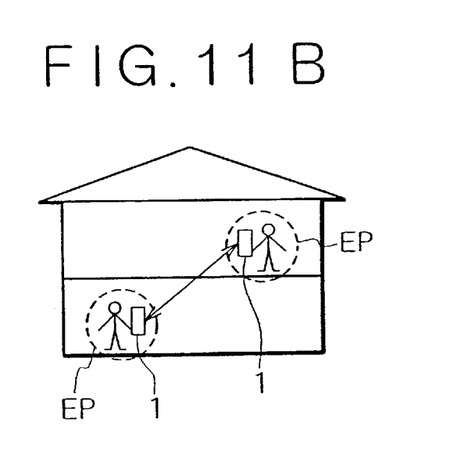

Due to the above-described advantageous characteristics, the portable 15 communication apparatus I having the diversity antenna apparatus may be very effective for use in a home, office or the like as indicated in FIG. 11A or 11B. That is, the portable communication apparatus 1 may provide an acceptable transmission and/or reception state for transmission and/or reception on the same floor as indicated in FIG. 11 A and also may provide an acceptable transmission and/or reception state for transmission and/or reception in a vertical or vertical and horizontal direction such as between the first floor and the second floor as indicated in FIG. 11B. In FIGS. 11A and 11B, the spherical radiation pattern of the portable communication apparatus 1 is represented by a dashed circle EP.

When transmission and/or reception is performed indoors such as in a home, office or the like, many reflecting objects such as the floor, ceiling and walls may be present. In such situation, the influence due to multi-path interference by reflected waves may be significant. However, since the portable communication apparatus 1 having the diversity antenna apparatus uses a circularly polarized wave, the influence of multi-path interference by reflected waves may be reduced and, as a result, satisfactory transmission and/or reception can be performed.

Although the portable communication apparatus 1 has been described hereinabove as including first to fourth antennae 10–13 in which the first and fourth antennae 10 and 13 and the second and third antennae 11 and 12 are used in a paired relationship to utilize a space diversity effect, the present portable communication apparatus is not so limited and instead may be configured differently. For example, the present portable communication apparatus may be configured so as to include only two antennae (such as the first and second antennae 10 and 11) each having a semispherical radiation pattern associated therewith and being disposed such that the back sides of the radiation patterns (that is, the sides opposite to the sides on which a gain is obtained) are opposed to each other. As a result of such arrangement, a substantially spherical radiation pattern may be formed by only two antennae, the advantages of the present invention may be obtained, and the configuration can be simplified.

Further, each antenna in the present invention is not limited to that which provides a semispherical radiation pattern as shown in FIG. 8 or 9. Instead, an antenna or antennae providing other types of patterns may be utilized with the present invention. For example, an antenna or antennae providing a radiation pattern having a sharp directivity so as to obtain a high gain may be utilized. However, in this situation, since it may be difficult for the respective antenna or antennae to cover a wide range, a plurality of antennae may be disposed spherically or cylindrically such that the front face sides thereof (that is, the sides at which the highest gain is obtained) are directed outwardly so that the entire antenna arrangement may have a substantially spherical radiation pattern. Furthermore, all of the antennae used in the present invention do not have to provide the same radiation pattern. That is, a first number of the antennae used in the present invention may provide a first radiation pattern, a second number of the antennae used in the present invention may provide a second radiation pattern, and so forth in which each radiation pattern may be different from one another. Therefore, in accordance with the present invention, the antennae may provide a number of different types of radiation patterns, however, the antennae as a whole should preferably have a substantially spherical radiation pattern.

Further, although in the above description a receiver (such as any of receivers 20–23) is connected to an antenna and the antenna changeover switch 25 is coupled to the receivers as illustrated in FIG. 7, the present invention is not limited to this specific arrangement and instead other arrangements may be utilized. For example, a antenna changeover switch 25 may be coupled to each antenna (or alternatively, a single changeover switch 25 may be coupled to all of the antennae) so as to receive signals therefrom and may also be coupled to a single receiver so as to supply an output thereto. In this situation, to compare the reception levels of the antennae with each other, the antennae may be successively switched by the antenna changeover switch(es) 25 so as to be connected to the receiver so that reception level signals indicative of the reception levels of the antennae may be inputted in a time series to the level comparator 24, whereupon a comparison of the levels may be performed. Thereafter, in response to the result of such comparison, the antenna changeover switch(es) 25 may be switched to select the appropriate one of the antennae which is to be used for transmission and/or reception.

Although in the above-described example only a single receiver is utilized, the present invention is not so limited. Alternatively, other numbers of receivers may be used. As an example, such number may be more than one and less than the number of antennae.

Thus, with the antenna changeover switch(es) 25 disposed between each antenna and the receiver(s) in the above-described manner, the connection of the antennae may be changed upon comparison of reception levels. However, since the number of receivers can be reduced (such as to one), a reduction in cost and miniaturization of the apparatus may be obtained.

Further, although in the above description two portable communication apparatus 1 have been described as transmitting and/or receiving a signal using a circularly polarized wave, the present invention is not so limited. As an alternative, one or more of the portable communication apparatus 1 on the transmission side and/or the reception side may transmit and/or receive a signal using other types of waves such as a linearly polarized wave. As such, a portable communication apparatus 1 on the transmission side and/or the reception side adapted for use with a circularly polarized wave may transmit and/or receive a signal to/from another antenna adapted for use with a linearly polarized wave.

An antenna apparatus adapted for use with a linearly polarized wave may be configured in a more simplified form as compared to an antenna apparatus adapted for use with a circularly polarized wave. Accordingly, if an antenna for one of the transmission side and the reception side is configured for use with a linearly polarized wave, the overall configuration can be simplified and a reduction of the cost may be obtained for the transmission and reception system. However, in this situation, the antenna transmission and/or reception efficiency may be lessen and the anti-multi-path characteristic may be lessen as compared to a configuration wherein an antenna adapted for use with a circularly polarized wave is used on both the transmission side and the reception side. However, the transmission and/or reception condition may not vary significantly due to changes in the angle of the antenna with respect to the ground. Accordingly, an acceptable transmission and/or reception condition may be obtained irrespective of the direction of the antenna with respect to the ground.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A diversity antenna apparatus, comprising:
    (a) a plurality of antennae for transmitting and/or receiving a circularly polarized wave; and
    (b) an antenna selection circuit which selects one of said antennae for transmission and/or reception based on information representative of reception levels of said antennae;
    (c) in which a first group of the antennae provides a first substantially semispherical radiation pattern and a second group of the antennae provides a second substantially semispherical radiation pattern such that said first and second groups of antennae as a whole provide a substantially spherical radiation pattern.

2. A diversity antenna apparatus according to claim 1, wherein said first and second groups of antennae are arranged such that back sides of the radiation patterns thereof are opposed to each other.

3. A diversity antenna apparatus according to claim 2, wherein at least one of said first and second groups includes at least two antennae spaced apart by a distance equal to or greater than $\lambda/4$ where $\lambda$ is a wavelength of an electromagnetic wave used for transmission and/or reception.

4. A diversity antenna apparatus according to claim 3, wherein the at least two antennae are patch antennae.

5. A diversity antenna apparatus according to claim 1, wherein at least one of said first and second groups of antennae includes at least two antennae spaced apart by a distance equal to or greater than $\lambda/4$ where $\lambda$ is a wavelength of an electromagnetic wave used for transmission and/or reception.

6. A diversity antenna apparatus according to claim 5, wherein the at least two antennae are patch antennae.

7. A diversity antenna apparatus according to claim 1, wherein at least one of the antennae is a patch antenna having an antenna portion with a length dimension A and a base portion with a length dimension B in which a ratio A/B has a value within a range 1/(1.5) to 1/(1.2).

8. A diversity antenna apparatus according to claim 1, wherein one antenna from said first group is located on a first face of a support housing and one antenna from said second group is located on a second face of said support housing.

9. A diversity antenna apparatus according to claim 8, wherein said first face is opposite to said second face.

10. A diversity antenna apparatus according to claim 1, wherein said first group includes at least one antenna and said second group includes at least one antenna.

11. A diversity antenna apparatus according to claim 1, wherein said first group includes at least two antennae and said second group includes at least two antennae.

12. A transmitting and/or receiving method comprising the steps of:
    (a) transmitting and/or receiving a circularly polarized wave by use of a plurality of antennae; and
    (b) selecting one of said antennae for transmission and/or reception based on information representative of reception levels of said antennae;
    (c) in which a first group of the antennae provides a first substantially semispherical radiation pattern and a second group of the antennae provides a second substantially semispherical radiation pattern such that said first and second groups of antennae as a whole provide a substantially spherical radiation pattern.

13. A method according to claim 12, wherein said first and second groups of antennae are arranged such that back sides of the radiation patterns thereof are opposed to each other.

14. A method according to claim 13, wherein at least one of said first and second groups includes at least two antennae spaced apart by a distance equal to or greater than $\lambda/4$ where $\lambda$ is a wavelength of an electromagnetic wave used for transmission and/or reception.

15. A method according to claim 14, wherein the at least two antennae are patch antennae.

16. A method according to claim 12, wherein at least one of said first and second groups of antennae includes at least two antennae spaced apart by a distance equal to or greater than $\lambda/4$ where $\lambda$ is a wavelength of an electromagnetic wave used for transmission and/or reception.

17. A method according to claim 16, wherein the at least two antennae are patch antennae.

18. A method according to claim 12, wherein at least one of the antennae is a patch antenna having an antenna portion with a length dimension A and a base portion with a length dimension B in which a ratio A/B has a value within a range 1/(1.5) to 1/(1.2).

19. A method according to claim 12, wherein one antenna from said first group is located on a first face of a support housing and one antenna from said second group is located on a second face of said support housing.

20. A method according to claim 19, wherein said first face is opposite to said second face.

21. A method according to claim 12, wherein said first group includes at least one antenna and said second group includes at least one antenna.

22. A method according to claim 12, wherein said first group includes at least two antennae and said second group includes at least two antennae.

* * * * *